US 6,587,411 B2

(12) United States Patent  
Hayashi (10) Patent No.: US 6,587,411 B2
(45) Date of Patent: *Jul. 1, 2003

(54) SIGNAL PROCESSING CIRCUIT HAVING A VOLTAGE CONTROLLED OSCILLATOR CAPABLE OF CONTINUOUSLY CHANGING THE CENTER FREQUENCY IN ACCORDANCE WITH A CONTROL VOLTAGE (75) Inventor: Yasuhiro Hayashi, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 143 days.

(21) Appl. No.: 08/783,016

(22) Filed: Jan. 14, 1997

(65) Prior Publication Data
US 2002/0009029 A1 Jan. 24, 2002

(30) Foreign Application Priority Data

Jan. 16, 1996 (JP) .............................................. 8-004932

(51) Int. Cl.[7] ................................................. G11B 7/00
(52) U.S. Cl. ................ 369/47.29; 369/47.3; 369/59.14; 369/59.2
(58) Field of Search ............................. 369/50, 32, 54, 369/58, 48, 240, 41, 44.27, 44.28, 47.29, 47.3, 59.14, 59.2, 124.05; 360/46, 51, 65, 48; 455/260; 331/179, 25

(56) References Cited

U.S. PATENT DOCUMENTS 4,280,104 A    7/1981  Rzeszewski
4,988,955 A    1/1991  Horie (List continued on next page.)

FOREIGN PATENT DOCUMENTS

EP   0 318 930    6/1989
JP   56-137738    10/1981

OTHER PUBLICATIONS

Patent Abstracts of Japan, vol. 096, No. 011, Nov. 29, 1996, JP 08 185666, Jul. 16, 1996.
Patent Abstracts of Japan, vol. 015, No. 495 (P–1288), Dec. 13, 1991, JP 03 214462, Sep. 19, 1991.

Primary Examiner—Ali Neyzari
(74) Attorney, Agent, or Firm—Oblon, Spivak, McClelland, Maier & Neustadt, P.C.

(57) ABSTRACT

A laser beam is irradiated from a pickup head on a disk. Light reflected by the disk is detected by the pickup head. The data is binarized by a data slice circuit, and a synchronizing clock and a synchronizing signal are extracted by a PLL and synchronizing signal separation circuit. The center frequency of the voltage controlled oscillator of the PLL and synchronizing signal separation circuit continuously changes according to a control voltage. A disk motor control circuit continuously changes the rotation speed of the disk in accordance with a control instruction from a system controller. The disk rotates at the highest rotation speed at which a data read operation is normally performed. The characteristics of the voltage controlled oscillator change in correspondence with the rotation speed of the disk.

30 Claims, 6 Drawing Sheets

U.S. PATENT DOCUMENTS

| | | |
|---|---|---|
| 5,019,785 A | 5/1991 | Fognini et al. |
| 5,089,757 A | 2/1992 | Wilson |
| 5,202,906 A | 4/1993 | Saito et al. |
| 5,233,316 A | 8/1993 | Yamada et al. |
| 5,239,274 A | 8/1993 | Chi |
| 5,300,898 A | 4/1994 | Chen et al. |
| 5,335,365 A | 8/1994 | Ballantyne et al. |
| 5,347,232 A | 9/1994 | Nishimichi |
| 5,388,087 A | 2/1995 | Saiki et al. |
| 5,389,898 A | 2/1995 | Taketoshi et al. ............... 331/2 |
| 5,420,545 A | 5/1995 | Davis et al. |
| 5,467,331 A | 11/1995 | Saiki et al. |
| 5,528,574 A * | 6/1996 | Takeuchi et al. ............... 369/50 |
| 5,577,086 A | 11/1996 | Fujimoto et al. |
| 5,579,184 A * | 11/1996 | Nakanishi et al. ............. 360/51 |
| 5,590,106 A * | 12/1996 | Shimizume et al. .......... 369/50 |
| 5,600,279 A | 2/1997 | Mori |
| 5,638,014 A | 6/1997 | Kurita |
| 5,671,201 A | 9/1997 | Yokota et al. |
| 5,694,380 A | 12/1997 | Shimizume et al. .......... 369/50 |
| 5,703,511 A | 12/1997 | Okamoto |
| 5,729,515 A | 3/1998 | Inagawa et al. |
| 5,764,609 A | 6/1998 | Araki et al. |
| 5,777,520 A | 7/1998 | Kawakami |
| 5,805,546 A | 9/1998 | Ando |
| 5,982,724 A * | 11/1999 | Hayashi et al. ................ 369/50 |
| 6,285,640 B1 * | 9/2001 | Hayashi et al. .......... 369/47.29 |

* cited by examiner

SIGNAL PROCESSING CIRCUIT HAVING A VOLTAGE CONTROLLED OSCILLATOR CAPABLE OF CONTINUOUSLY CHANGING THE CENTER FREQUENCY IN ACCORDANCE WITH A CONTROL VOLTAGE

BACKGROUND OF THE INVENTION

The present invention relates to an improvement of a read apparatus particularly in a CD-ROM drive system or a DVD (digital versatile disc) drive system.

Figure 1:
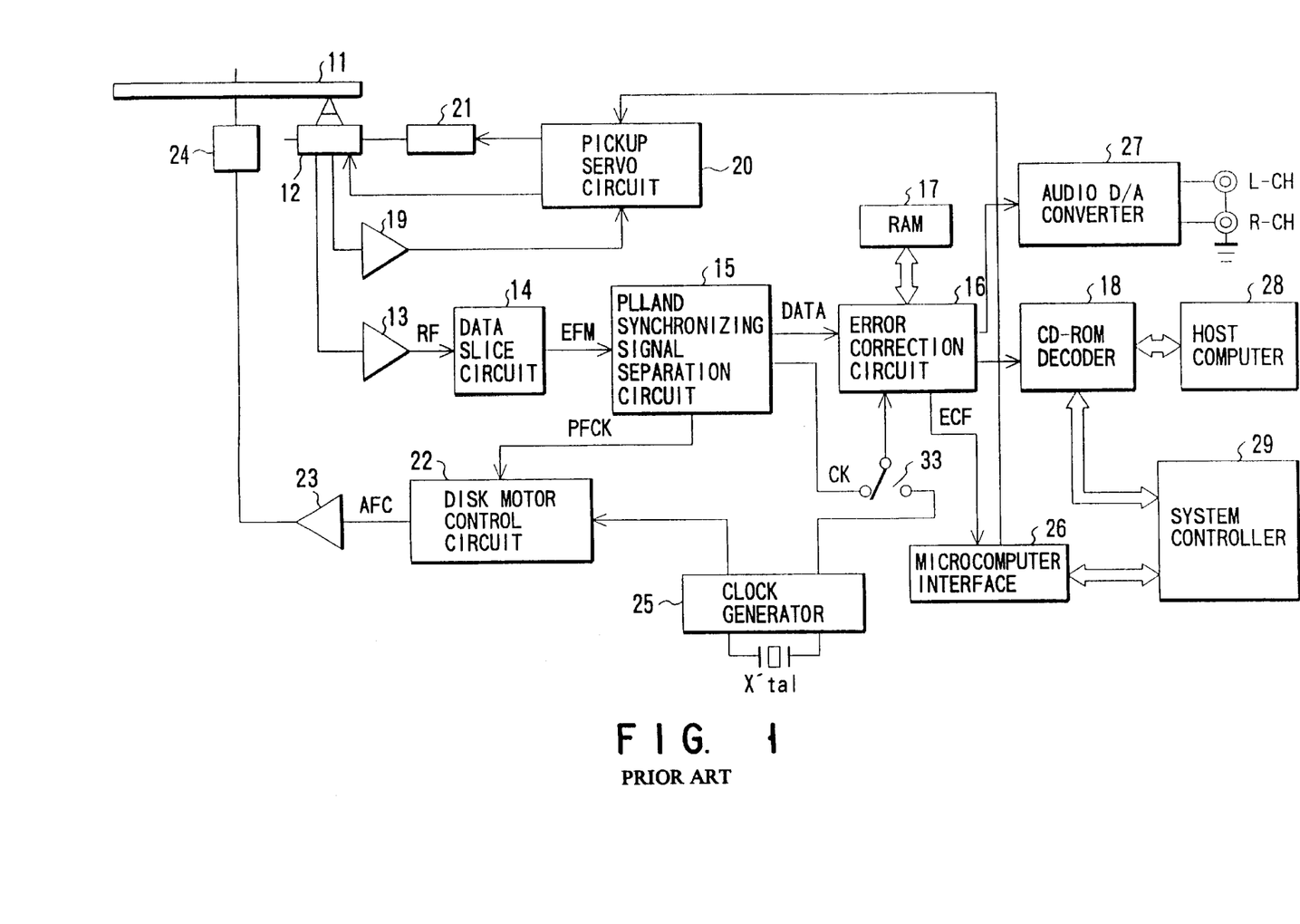
FIG. 1 is a diagram showing a conventional read apparatus.

FIG. 1 is a diagram showing the arrangement of a conventional read apparatus in a CD-ROM drive system.

A pickup head 12 irradiates a laser beam on the surface of a disk 11, detects light reflected by the disk 11, and converts the reflected light into an electrical signal. The output signal from the pickup head 12 is amplified to an RF signal by an amplifier 13. This RF signal is input to a data slice circuit 14.

The data slice circuit 14 has a function of binarizing the RF signal. Data which is binarized by the data slice circuit 14 is called an EFM (Eight to Fourteen Modulation) signal.

The EFM signal is input to a PLL (Phase-Locked Loop) and synchronizing signal separation circuit 15. The PLL and synchronizing signal separation circuit 15 generates a synchronizing signal PFCK, a synchronizing clock CK, and a data signal DATA on the basis of the EFM signal. The data signal DATA and the synchronizing clock CK are input to an error correction circuit 16. The error correction circuit 16 performs error correction processing using a correction RAM 17.

When the data of a disk having a CD-ROM format is being read, the read apparatus is normally operated at a ×2 or more speed in many cases.

The corrected data is transferred to a CD-ROM decoder 18. At this time, the clock for controlling the operation of the error correction circuit 16 is the synchronizing clock CK output from the PLL and synchronizing signal separation circuit 15.

A clock selector 33 supplies the synchronizing clock CK output from the PLL and synchronizing signal separation circuit 15 or a clock output from a clock generator 25 to the error correction circuit 16.

In read access to a CD-ROM, the data can be read at a high speed by operating the error correction circuit 16 with the synchronizing clock CK output from the PLL and synchronizing signal separation circuit 15. This technique is described in detail in, e.g., Japanese Patent Application No. 6-339463 (filed on Dec. 29, 1994).

The CD-ROM decoder 18 corrects and buffers the data of the CD-ROM, and then transfers the data to a host computer 28 at a high speed.

When a disk which stores a digital audio signal is being read, the data is input to an audio D/A (Digital/Analog) converter 27, and the audio data is output from the output terminal at a ×1 speed. Since the clock selector 33 supplies a crystal system clock generated by the clock generator 25 to the error correction circuit 16, high-quality audio data can be obtained.

The synchronizing signal PFCK extracted from the EFM signal by the PLL and synchronizing signal separation circuit 15 is sent to a disk motor control circuit 22 and compared with the clock from the clock generator 25. The disk motor control circuit 22 outputs, on the basis of the comparison result, a driving signal AFC (automatic speed control signal) for rotating the disk.

A driver 23 drives a disk motor 24 on the basis of the driving signal AFC such that the data read rate matches a predetermined rate.

A system controller 29 reads, via a microcomputer interface 26, a correction flag or a compensation flag (error correction flag ECF) obtained by correction processing by the error correction circuit 16.

The system controller 29 confirms the error generation frequency on the basis of the information of the correction flag or compensation flag. If it is determined that too many errors are generated by the high-speed read operation, the system controller 29 performs processing of reducing the data read rate.

A servo system signal read from the pickup 12 is sent to a pickup servo circuit 20 through an amplifier 19 and subjected to equalizing processing by the pickup servo circuit 20. An output signal from the pickup servo circuit 20 is supplied to the actuator of the pickup 12 and a pickup feed motor 21 to control the operation of the actuator and the pickup feed motor.

The system controller 29 controls the CD-ROM decoder 18 and also controls the pickup servo circuit 20 via the microcomputer interface 26.

To change the read rate, generally, the LSI often has an arrangement for realizing a ½$^n$ read rate with respect to the reference clock generated by the clock generator 25. More specifically, if the maximum rate is ×4, a ×2 or ×1 read rate can be realized.

A CD system is originally an audio reproduction system. For this reason, a disk is normally rotated at a ×1 speed. However, when the CD system is applied to a CD-ROM drive, its data transfer rate is lower than that of the memory medium of a general computer.

It is an important challenge to raise the data transfer rate in consideration of read processing of recent large-capacity moving picture data. Recently, ×4 players have become popular, and the transfer rate is further increasing from ×4 to ×6, and to ×8.

In the prior art, however, when the read rate is to be changed, only a read rate corresponding to ½$^n$ (e.g., a ×4, ×2, or ×1 rate) the highest frequency can be realized as the disk rotation speed.

In addition, the CD disk standard is generally determined on the assumption of the ×1 speed. For this reason, for a disk having an extreme eccentricity or abnormal pit formation, the seek performance is degraded in high-speed rotation at, e.g., a ×4 or ×6 speed, resulting in erroneous data read.

As described above, for a disk having an eccentricity or abnormal pit formation, the conventional CD system cannot read the data by high-speed disk rotation. The data transfer rate must be extremely (discontinuously) reduced from, e.g., ×4 to ×2, and to ×1.

Accordingly, the seek time becomes long at a low speed, so the characteristics of the CD-ROM drive suitable for the high-speed read operation cannot be completely exhibited.

When the quartz oscillator is exchanged, or a VCO (Voltage Controlled Oscillator) is arranged, the disk can be rotated not only at a speed corresponding to ½$^n$ the highest frequency but also at an intermediate speed.

However, when a VCO is used to change the data read rate (data transfer rate), and the center frequency of the VCO is fixed, the data transfer rate can be changed only within the range of ±50% of the center frequency of the VCO.

Therefore, if the data transfer rate is changed in correspondence with the change in read rate, the higher and lower dynamic ranges with respect to the output frequency of the VCO become nonuniform. In the subsequent seek operation, the PLL loop cannot be stably locked in correspondence with the change in data transfer rate.

BRIEF SUMMARY OF THE INVENTION

The present invention has been made to solve the above problems, and has as its object to provide a signal processing circuit which can continuously change the read rate only by using one reference quartz oscillator, i.e., realize not only a read rate corresponding to ½" the highest frequency but also an intermediate read rate, and prevents the seek performance from being degraded even in a high-speed read operation, and a read apparatus using the circuit.

In order to achieve the above object, according to the present invention, there is provided a signal processing circuit comprising PLL/synchronizing signal separation means, having a voltage controlled oscillator capable of continuously changing a center frequency in accordance with a control voltage, for extracting a synchronizing clock and a synchronizing signal on the basis of data read from a disk, disk motor control means for rotating the disk and continuously changing a rotation speed of the disk in accordance with a control instruction, and conversion means for converting the control instruction into the control voltage, wherein the voltage controlled oscillator is controlled such that an output frequency becomes the center frequency.

The disk motor control means rotates the disk at the highest rotation speed at which a data read operation is normally performed.

The signal processing circuit of the present invention further comprises data slice means for binarizing the data read from the disk to generate an EFM signal, and supplying the EFM signal to the PLL/synchronizing signal separation means.

The signal processing circuit of the present invention further comprises memory means for storing the data (excluding the synchronizing clock and the synchronizing signal), and error correction means, operated on the basis of the synchronizing clock, for performing error correction processing of the data (excluding the synchronizing clock and the synchronizing signal), and generating a correction flag and a compensation flag.

The disk motor control means determines the rotation speed of the disk on the basis of a reference clock, the synchronizing signal, and the control instruction.

There is also provided a read apparatus comprising pickup means for reading data from a disk, PLL/synchronizing signal separation means, having a voltage controlled oscillator capable of continuously changing a center frequency in accordance with a control voltage, for extracting a synchronizing clock and a synchronizing signal on the basis of the data read from the disk, disk motor control means for rotating the disk and continuously changing a rotation speed of the disk in accordance with a control instruction, conversion means for converting the control instruction into the control voltage, and a system controller for generating the control instruction, wherein the voltage controlled oscillator is controlled such that an output frequency becomes the center frequency.

The read apparatus of the present invention further comprises memory means for storing the data (excluding the synchronizing clock and the synchronizing signal), and error correction means, operated on the basis of the synchronizing clock, for performing error correction processing of the data (excluding the synchronizing clock and the synchronizing signal), and generating a correction flag and a compensation flag, wherein the system controller reads the correction flag and the compensation flag and generates the control instruction on the basis of information of the correction flag and the compensation flag.

The system controller supplies, to the disk motor control means, the control instruction for rotating the disk at the highest rotation speed at which correction processing of the data can be performed by the error correction means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A signal processing circuit of the present invention and a read apparatus using the circuit will be described below in detail with reference to the accompanying drawings.

Figure 2:
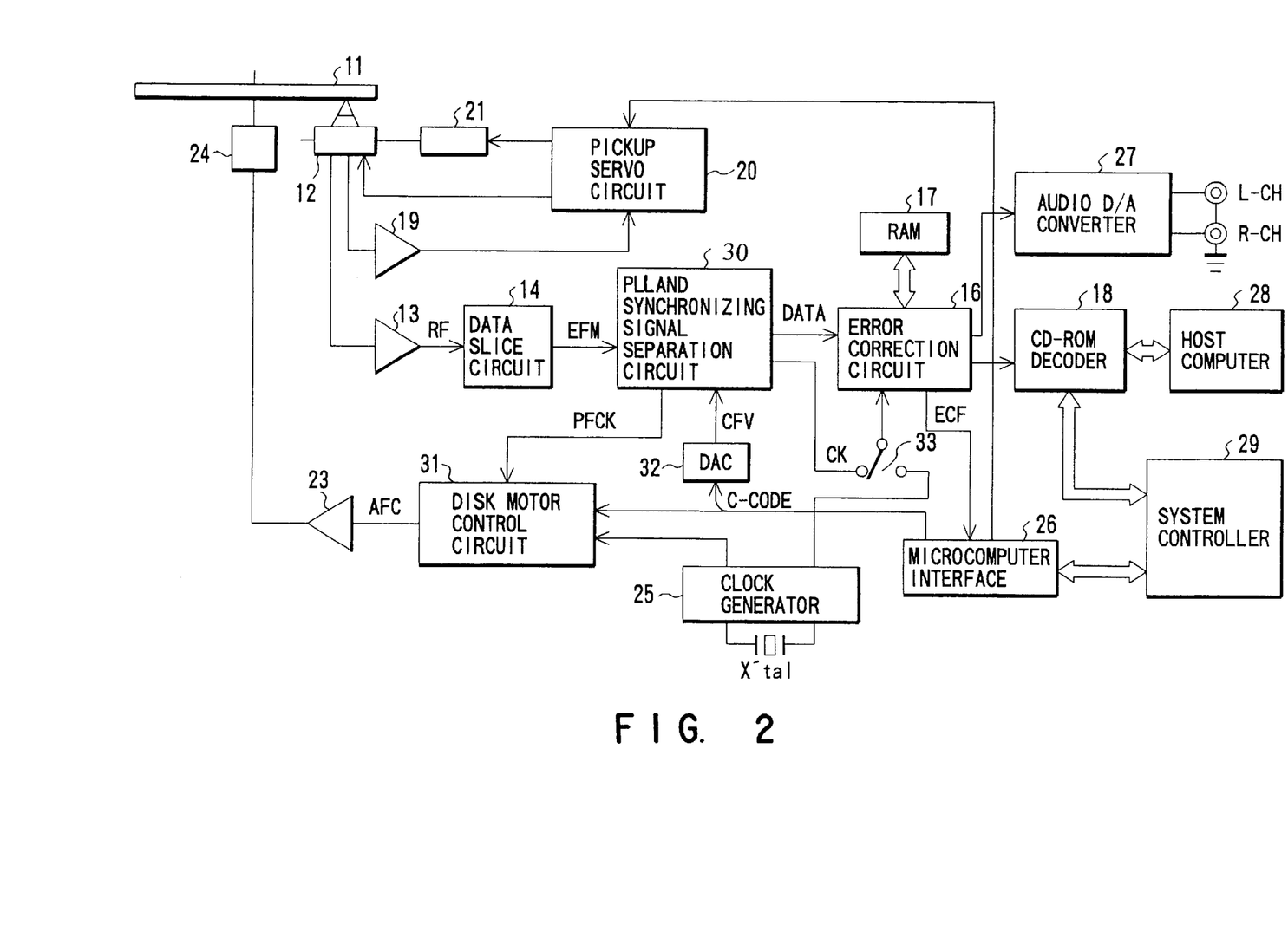
FIG. 2 is a diagram showing a read apparatus according to an embodiment of the present invention.

FIG. 2 is a diagram showing an optical disk read apparatus according to an embodiment of the present invention.

A pickup head 12 irradiates a laser beam on the surface of a disk 11, detects light reflected by the disk 11, and converts the reflected light into an electrical signal. The output signal from the pickup head 12 is amplified to an RF signal by an amplifier 13. This RF signal is input to a data slice circuit 14.

The data slice circuit 14 has a function of binarizing the RF signal. Data which is binarized by the data slice circuit 14 is called an EFM signal.

The EFM signal is input to a PLL and synchronizing signal separation circuit 30. The PLL and synchronizing signal separation circuit 30 generates a synchronizing signal PFCK, a synchronizing clock CK, and a data signal DATA on the basis of the EFM signal. The synchronizing clock CK and the data signal DATA are input to an error correction circuit 16. The error correction circuit 16 performs error correction processing using a correction RAM 17.

When the data of a disk having a CD-ROM format is being read, the read apparatus is normally operated at a ×2 or more speed in many cases.

The corrected data is transferred to a CD-ROM decoder 18. At this time, the clock for controlling the operation of the error correction circuit 16 is the synchronizing clock CK output from the PLL and synchronizing signal separation circuit 30. A clock selector 33 supplies the synchronizing clock CK output from the PLL and synchronizing signal separation circuit 30 or a clock output from a clock generator 25 to the error correction circuit 16.

In read access to a CD-ROM, the data can be read at a high speed by operating the error correction circuit 16 with the synchronizing clock CK output from the PLL and synchronizing signal separation circuit 30. The CD-ROM decoder 18 corrects and buffers the data of the CD-ROM, and then transfers the data to a host computer 28 at a high speed.

When a disk which stores a digital audio signal is being read, the data is input to an audio D/A converter 27, and the audio data is output from the output terminal at a ×1 speed. Since the clock selector 33 supplies a crystal system clock generated by the clock generator 25 to the error correction circuit 16, high-quality audio data can be obtained.

The synchronizing signal PFCK extracted by the PLL and synchronizing signal separation circuit 30 is sent to a disk motor control circuit 31 and compared with the clock from the clock generator 25. The disk motor control circuit 31 outputs, on the basis of the comparison result, a driving signal AFC for rotating the disk.

A driver 23 drives a disk motor 24 on the basis of the driving signal AFC such that the data read rate matches a predetermined rate.

A system controller 29 reads, via a microcomputer interface 26, a correction flag or a compensation flag (ECF) obtained by correction processing by the error correction circuit 16.

The system controller 29 confirms the error generation frequency on the basis of the information of the correction flag or compensation flag. If it is determined that a large number of errors are generated, the system controller 29 determines that the high-speed read operation is disabled, and performs processing of reducing the read rate.

A servo system signal read from the pickup 12 is sent to a pickup servo circuit 20 through an amplifier 19 and subjected to equalizing processing. An output signal from the pickup servo circuit 20 is supplied to the actuator of the pickup 12 and a pickup feed motor 21 to drive the actuator and the pickup feed motor.

The system controller 29 controls the CD-ROM decoder 18 and also controls the pickup servo circuit 20 via the microcomputer interface 26.

The read apparatus of the present invention uses a variable speed read technique (e.g., FIG. 2 of Japanese Patent Application No. 6-339463 (filed on Dec. 29, 1994)).

However, only with this variable speed read technique, the object of the present invention cannot be achieved.

The reason for this is as follows. To freely and continuously change the rotation of a disk in a steady state (to realize not only a read rate corresponding to ½" the highest frequency but also an intermediate read rate), a means for freely and continuously changing the reference rotation speed of the disk motor must be arranged. In addition, to prevent the seek performance from being degraded in high-speed rotation, the characteristics of a VCO in the PLL which has only a limited variable range must always be changed in correspondence with the continuous read rate.

For these purposes, the reference value of the rotation speed of the disk motor is changed in accordance with a read rate (rotation control) instruction from the system controller 29, and the characteristics of the VCO in the PLL system are also changed in accordance with this instruction.

More specifically, the system controller 29 reads, via the microcomputer interface 26, the correction flag or compensation flag (error correction flag ECF) obtained by correction processing by the error correction circuit 16.

The system controller 29 determines on the basis of the information of the correction flag or compensation flag whether the high-speed read operation is enabled. If it is determined that the high-speed read operation is disabled, the system controller 29 outputs an instruction for reducing the data read rate.

Conventionally, in processing of reducing the read rate, the read rate is largely (discontinuously) reduced. In the present invention, however, the read rate is continuously reduced to a rate at which the data read operation is enabled (i.e., a rate at which the number of errors is sufficiently reduced) without largely (discontinuously) reducing the read rate.

The system controller 29 monitors the error correction flag ECF and controls the disk motor control circuit 31 on the basis of the value of the error correction flag ECF. A signal C-CODE for controlling the rotation speed (read rate) is transferred to the disk motor control circuit 31 via the microcomputer interface 26.

The signal C-CODE is converted into an analog signal (control voltage CFV) by a D/A converter 32 and then changes the characteristics of a VCO in the PLL and synchronizing signal separation circuit 30.

As described above, the present invention is characterized in that the rotation of a disk in a steady state is freely and continuously changed, and the characteristics of the VCO in the PLL are changed in correspondence with the rotation speed of the disk.

The means for freely and continuously changing the rotation of the disk in the steady state will be described first.

Figure 3:
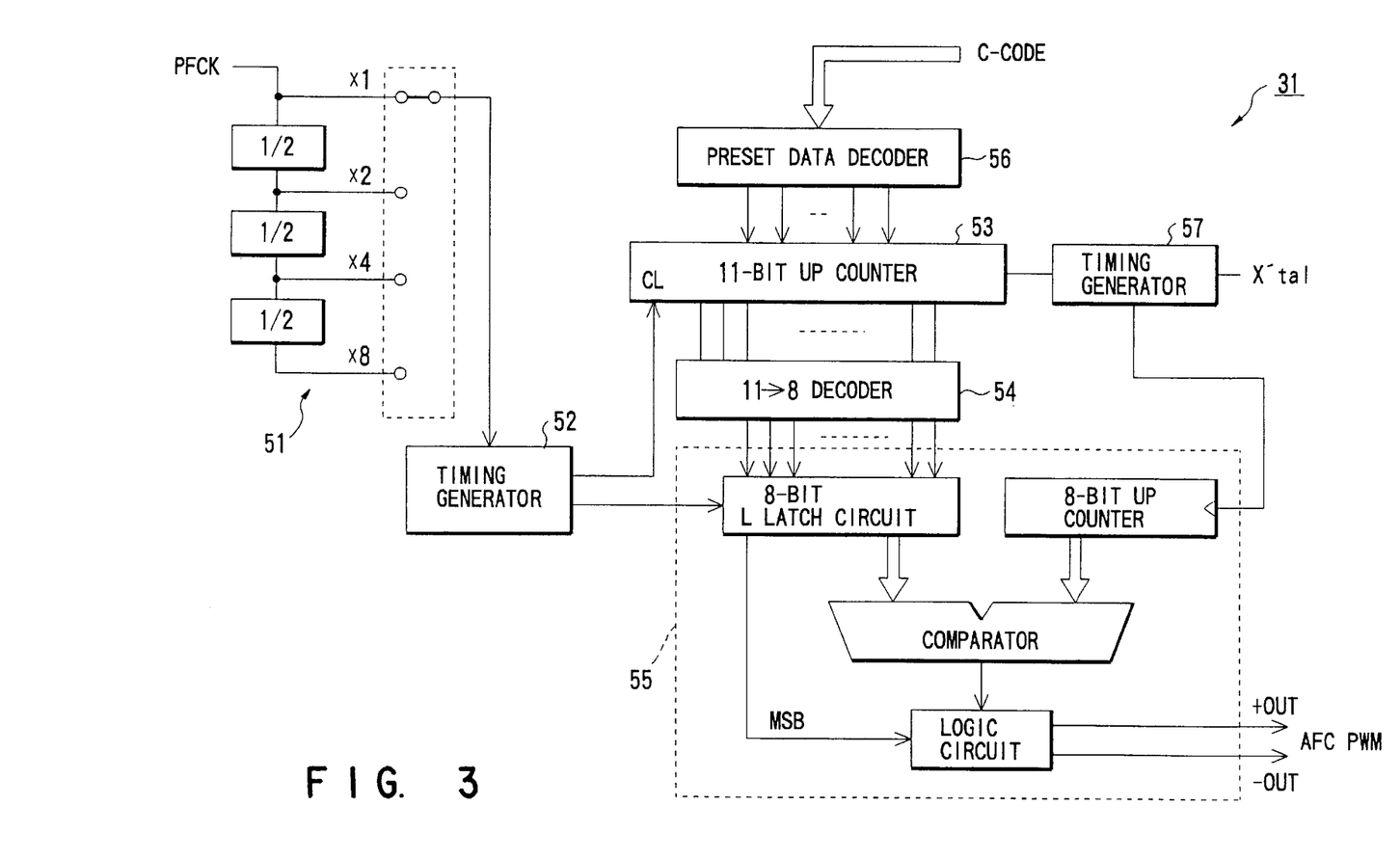
FIG. 3 is a diagram showing the arrangement of a disk motor control circuit shown in FIG. 2.

FIG. 3 is a circuit diagram showing an example of the disk motor control circuit 31.

The synchronizing signal PFCK output from the PLL and synchronizing signal separation circuit is selected by a selector 51 which selects a ×1, ×2, ×4, or ×8 speed, and input to a timing generator 52.

In a CD system, the synchronizing signal PFCK has a frequency of 7.35 kHz at the ×1 speed.

As the read rate increases to ×2, ×4, or ×8, the input data rate also increases. Therefore, the frequency of the synchronizing signal PFCK output from the PLL and synchronizing signal separation circuit is also raised to ×2, ×4, or ×8.

When the ×8 speed is selected by the selector 51, the frequency of the synchronizing signal PFCK is lowered to ⅛. Therefore, when a predetermined read rate (×1, ×2, ×4, or ×8) is set, the frequency measured by the disk motor control circuit is always 7.35 kHz.

When an intermediate frequency between predetermined read rates (×1, ×2, ×4, and ×8) is set by the control instruction C-CODE from the system controller, or when a seek operation for a disk having an extreme eccentricity is performed, the frequency output from the PLL and synchronizing signal separation circuit in accordance with the control instruction C-CODE and measured by the disk motor control circuit becomes higher or lower than 7.35 kHz in correspondence with the data transfer rate.

The timing generator 52 generates a pulse for latching or clearing the value of an 11-bit up counter 53 on the basis of the edge of the pulse of the synchronizing signal PFCK, and at the same time, measures the period of the synchronizing signal PFCK.

For example, in measurement of the period of the synchronizing signal PFCK (7.35 kHz), the period counted at the frequency of a general crystal system clock in a CD system, i.e., at 4.2336 MHz (output from a timing generator 57) corresponds to 576 clocks.

The lower 8 bits (count value) of the 11-bit up counter 53 are received by a PWM conversion circuit 55 through an 11→decoder 54.

The 11→decoder 54 converts bit data with a count value equal to or smaller than 1,024 into 8-bit data with a minimum value of "0", and bit data with a count value equal to or larger than 1,279 into 8-bit data with a maximum value of "255". The 11→decoder 54 converts bit data with count values between 1,024 and 1,279 into 8-bit data with values of 0 to 255, respectively, and outputs the values to the PWM conversion circuit 55, as a matter of course.

Figure 4:
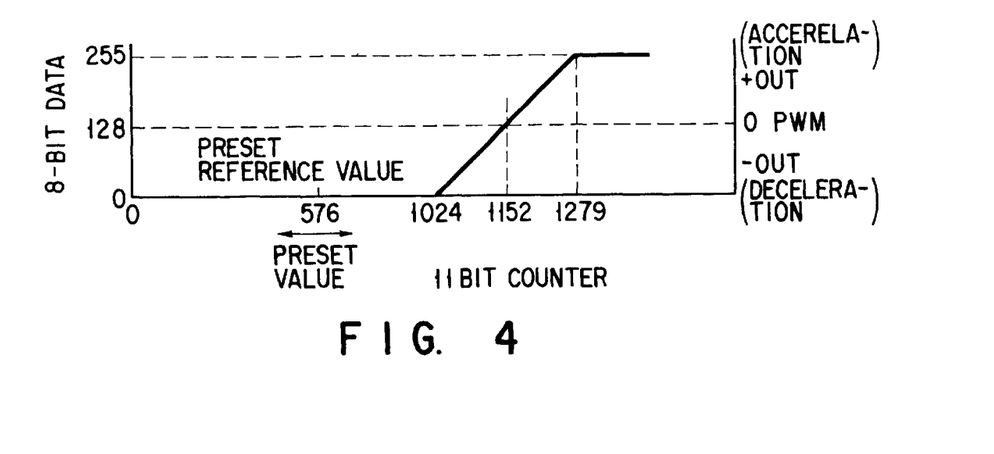
FIG. 4 is a graph showing the characteristics of the circuit shown in FIG. 3.

As shown in FIG. 4, the characteristic of the 11→8 decoder 54 is set such that when a count value of 1,152 of the 11-bit up counter 53 is set at the center, a linear data conversion region can be obtained within the range of ±128 steps from the center value.

The PWM conversion circuit 55 is set such that, upon receiving 8-bit data with a value of 128 (count value of 1,152), an AFC signal for maintaining the current read rate is output, upon receiving 8-bit data with a value larger than 128 (count value larger than 1,152), an AFC signal for increasing read rate is output, and upon receiving 8-bit data with a value smaller than 128 (count value smaller than 1,152), an AFC signal for reducing the read rate is output.

More specifically, the PWM conversion circuit 55 performs pulse width modulation of the 8-bit data, and outputs the data, through a logic circuit 58, as an AFC signal for controlling the rotation speed of the disk motor.

A preset value as the initial value of the 11-bit up counter 53 is set in a preset decoder 56. The preset value is changed in accordance with the control instruction C-CODE from the system controller.

Assume that when the control instruction C-CODE is "8", and the frequency PFCK is 7.35 kHz, "576" is set in the preset decoder 56 as the initial value of the 11-bit up counter 53. In this case, the 11-bit up counter 53 counts values up to 1,152 (preset value "576"+576) in the period of the synchronizing signal PFCK, so that the read rate is controlled not to change. Therefore, the preset value of "576" is used as a preset reference value for ×1, ×2, ×4, and ×8 read rates.

When the control instruction C-CODE is changed to set a preset value larger than the preset reference value (576), the 11-bit up counter 53 counts values up to a value larger than 1,152 first, so that the read rate is controlled to increase. When the read rate increases, the period of the synchronizing signal PFCK becomes short. For this reason, the upper limit of the count value gradually becomes small. Finally, the 11-bit up counter 53 counts values up to 1,152, so that the read rate has a value corresponding to the preset value determined by the control instruction C-CODE.

To the contrary, when the control instruction C-CODE is changed to set a preset value smaller than the preset reference value (576), the 11-bit up counter 53 counts up to a value smaller than 1,152 first, so that the read rate is controlled to decrease. When the read rate decreases, the period of the synchronizing signal PFCK becomes long. For this reason, the upper limit of the count value gradually becomes large. Finally, the 11-bit up counter 53 counts up to 1,152, so that the read rate has a value corresponding to the preset value determined by the control instruction C-CODE.

In this manner, by changing the preset value in correspondence with the value of the control instruction C-CODE, the read rate (rotation speed of the disk) can be freely and continuously changed.

Figure 5:
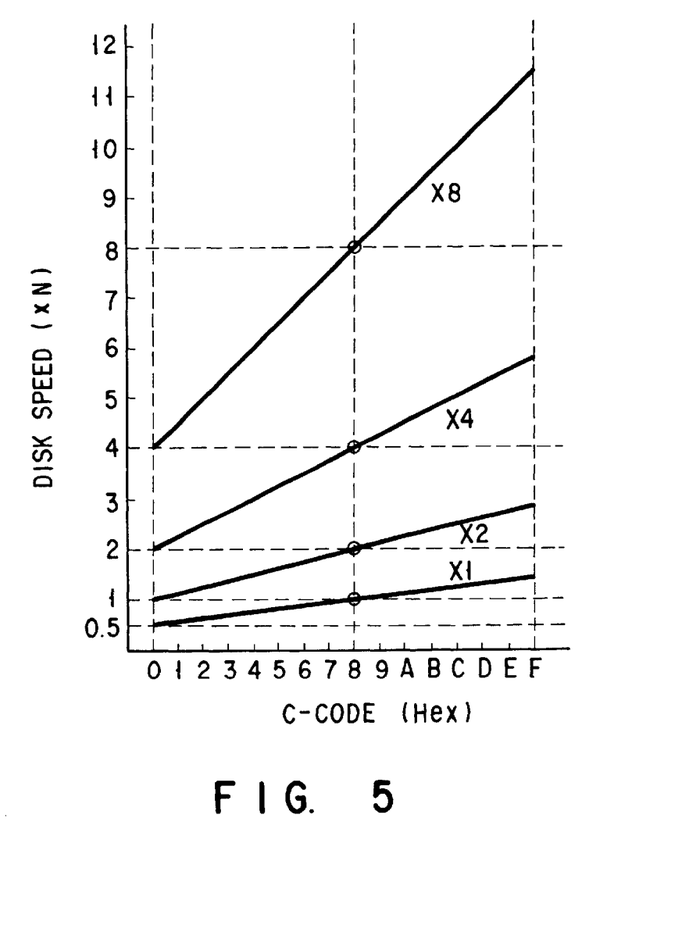
FIG. 5 is a graph showing the relationship between a control instruction C-CODE and a disk speed.

FIG. 5 is a graph showing the relationship between the control instruction C-CODE from the system controller 29 and the disk speed.

The system controller sets the control instruction C-CODE on the basis of the error correction flag ECF output from the error correction circuit. More specifically, since the error correction flag ECF represents the error rate of data, the quality of the data can be determined by referring to the error correction flag ECF.

More specifically, the rotation speed limit of the disk at which the data can be read while maintaining a predetermined quality is set. When the rotation speed exceeds this limit value, the control instruction C-CODE is changed to perform control for reducing the disk rotation speed. In addition, the control instruction C-CODE is changed to perform control for increasing the disk rotation speed such that the data is read at the maximum disk rotation speed at which the data can be read while maintaining a predetermined quality.

The system controller can continuously change the disk rotation speed within the range of ±50% the central speed (C-CODE ="8") in the read mode (×1, ×2, ×4, or ×8) by changing the control instruction C-CODE.

As is apparent from FIG. 5, the present invention makes it possible to transfer data not only at a $2^n$-times read rate as discrete values such as ×1, ×2, ×4, and ×8 but also at an intermediate read rate only by changing the control instruction C-CODE from the system controller, unlike the prior art in which only a $2^n$-times read rate as discrete values can be realized.

The respective read modes have some overlap ranges. Therefore, as for the absolute value of the read rate, the rotation speed can be continuously changed from ×½ to ×12 at maximum.

A means for changing the characteristics of the VCO in the PLL in accordance with the rotation speed of the disk will be described below.

When the data read rate is to be continuously changed using the VCO, and the seek performance in the high-speed read operation is to be improved, the center frequency of the VCO must be variably set.

Figure 6:
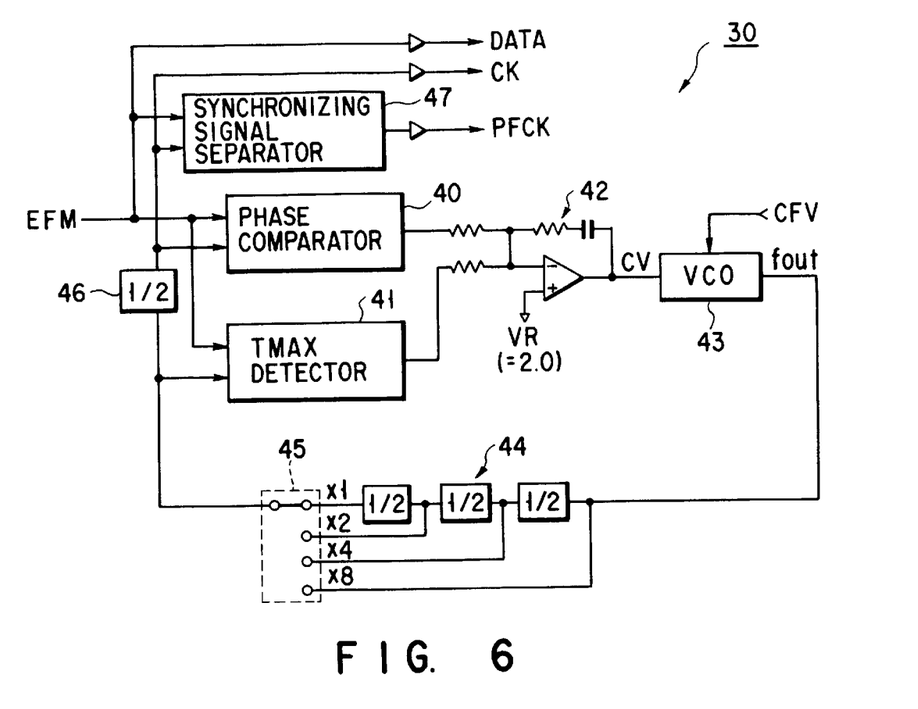
FIG. 6 is a diagram showing the arrangement of a PLL and synchronizing signal separation circuit shown in FIG. 2.

FIG. 6 is a circuit diagram showing an example of the PLL and synchronizing signal separation circuit 30.

The EFM signal output from the data slice circuit is input to a phase comparator 40 and a TMAX detector 41. The phase comparator 40 is a circuit for comparing the phase of the EFM signal with that of the synchronizing clock CK. The TMAX detector 41 is a circuit for detecting a signal TMAX having a maximum length (11T for an EFM signal; 1T=1/4.32 MHz at the ×1 speed) contained in the EFM signal based on the CD format.

A frequency divider 46 is arranged to increase the resolution of the TMAX detector 41, so that the TMAX detector 41 measures the signal at a frequency twice the synchronizing clock CK.

The output signal from the phase comparator 40 and the output signal from the TMAX detector 41 are added by a low-pass filter 42 into a voltage signal CV for controlling a VCO 43.

An oscillation output fout from the VCO 43 is input to a frequency divider 44 and a selector 45 which selects a ×1, ×2, ×4, or ×8 rate mode.

The oscillation output fout from the VCO 43 is input to a synchronizing signal separator 47 through the frequency divider 44, the selector 45, and the frequency divider 46. The synchronizing signal separator 47 generates the synchronizing signal PFCK and outputs the synchronizing signal PFCK.

A voltage CFV is input to the VCO 43. The voltage CFV changes depending on the control instruction C-CODE from the system controller.

Figure 8:
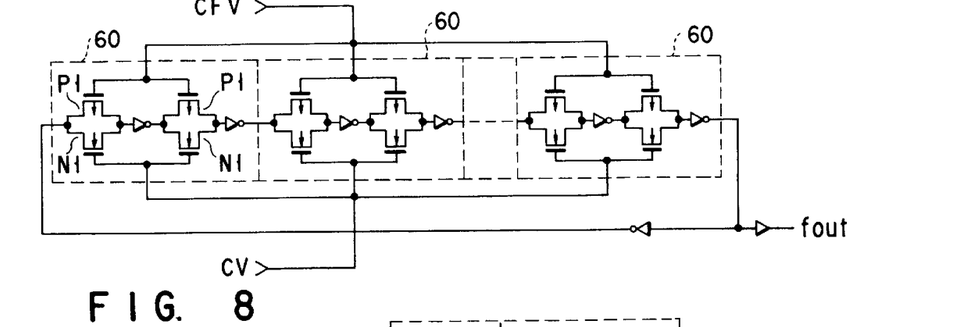
FIG. 8 is a circuit diagram showing the arrangement of the VCO shown in FIG. 6.
Figure 9:
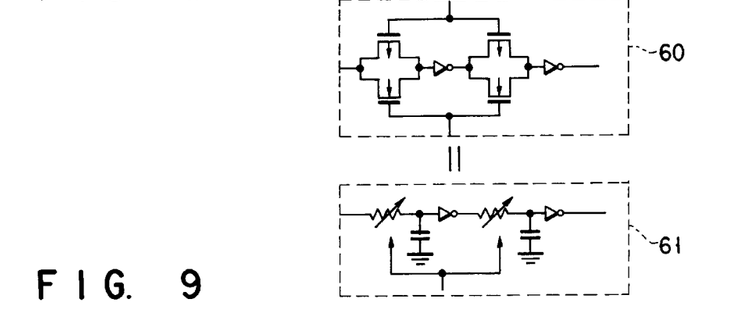
FIG. 9 is a circuit diagram showing a circuit equivalent to part of the circuit shown in FIG. 8.

FIG. 8 is a circuit diagram showing an example of the VCO. FIG. 9 is a circuit diagram showing a circuit equivalent to part of the circuit constituting the VCO shown in FIG. 8.

As a VCO formed in a CMOS/LSI, a circuit constituted by a ring oscillator as shown in FIG. 8 is generally used. A circuit 60 constituted by a p-channel MOS transistor P1 and an n-channel MOS transistor N1 is equivalent to a delay circuit 61 constituted by a rheostat and a capacitor.

When the bias to the gate electrode of the p-channel MOS transistor P1 and the bias to the gate electrode of the n-channel MOS transistor N1 are changed, the delay amount of the delay circuit 61 can be controlled. N delay circuits 61 (i.e., the circuits 60) are connected in series, and an output from this circuit is inverted and fed back to the input terminal. With this arrangement, the oscillation frequency of the ring oscillator can be controlled.

In this embodiment, the control voltage CFV is input to the gate of the p-channel MOS transistor P1, and the output voltage CV from the low-pass filter 42 shown in FIG. 5 is input to the gate of the n-channel MOS transistor N1. With this operation, predetermined characteristics as shown in FIG. 7 can be realized in accordance with the control voltage CFV and the input voltage CV.

Figure 7:
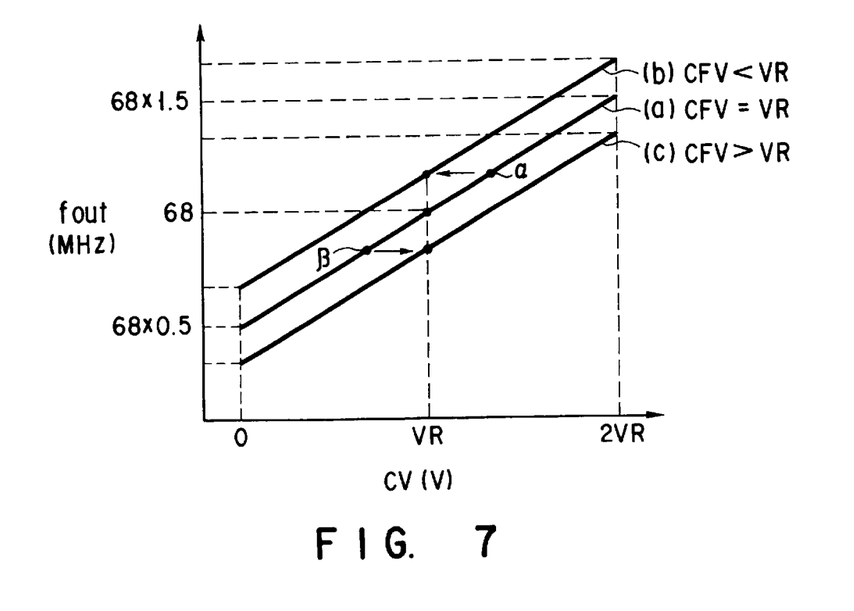
FIG. 7 is a graph showing the characteristics of a VCO shown in FIG. 6.

FIG. 7 is a graph showing the characteristics of the input voltage CV and the oscillation output fout of the VCO, which are observed when the voltage CFV changes.

Assume that the voltage CFV is a reference value VR (e.g., 2.0 V) of the PLL loop. When the voltage CFV is 2.0 V, the VCO exhibits a characteristic (a) representing a center frequency of 68 MHz and having a variable range of about ±50%.

More specifically, even when the input data rate changes by about ±50% due to the seek operation from the steady state, the PLL loop can be locked, so that the data read operation is enabled.

When the disk rotation speed (data transfer rate) is increased by the control instruction C-CODE, the input data rate increases, and the input voltage CV is also raised. For this reason, the output frequency fout is also raised (point '). In this state, however, since the center frequency of the VCO is 68 MHz, the higher and lower dynamic ranges with respect to the output frequency fout become nonuniform. In the subsequent seek operation, the PLL loop cannot be stably locked according to the change in data transfer rate.

To prevent this, the system controller increases the disk rotation speed by the control instruction C-CODE, and at the same time, changes the characteristics of the VCO such that the output frequency fout becomes the center frequency after the increase in disk rotation speed.

More specifically, when the value of the voltage CFV is made smaller than the reference value VR, the gate potential of the p-channel MOS transistor P1 of the ring oscillator constituted by the delay circuits shown in FIGS. 8 and 9 is lowered, and the delay time for each delay circuit is shortened. As a result, the characteristic changes from (a) to (b), i.e., shifts to the high-frequency side.

Therefore, even when the seek operation from the steady state caused by the eccentricity of the disk is performed in this state, the PLL loop can be locked according to the change in input data rate within the range of about ±50%.

Similarly, when the disk rotation speed (data transfer rate) is reduced by the control instruction C-CODE, the input data rate is reduced, and the input voltage CV is lowered. For this reason, the output frequency fout is also lowered (point α).

In this state, however, since the center frequency of the VCO is 68 MHz, the higher and lower dynamic ranges with respect to the output frequency fout become nonuniform. In the subsequent seek operation, the PLL loop cannot be stably locked according to the change in data transfer rate.

To prevent this, the system controller reduces the disk rotation speed by the control instruction C-CODE, and at the same time, changes the characteristics of the VCO such that the output frequency fout becomes the center frequency after the decrease in disk rotation speed.

More specifically, when the value of the voltage CFV is made larger than the reference value VR, the gate potential of the p-channel MOS transistor P1 of the ring oscillator constituted by the delay circuits shown in FIGS. 8 and 9 is raised, and the delay time for each delay circuit is prolonged. As a result, the characteristic changes from (a) to (c), i.e., shifts to the low-frequency side.

Therefore, even when the seek operation from the steady state caused by the eccentricity of the disk is performed in this state, the PLL loop can be locked according to the change in input data rate within the range of about ±50%.

Figure 10:
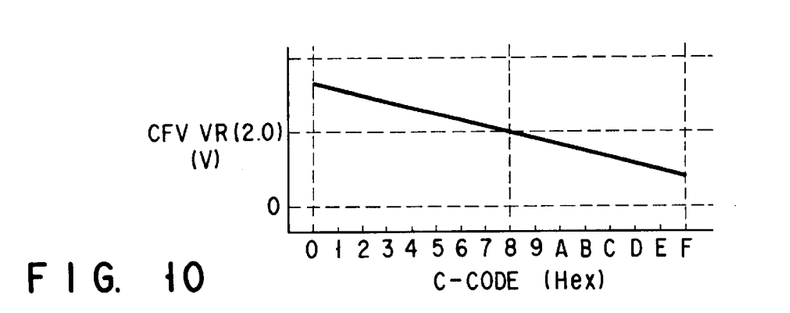
FIG. 10 is a graph showing the relationship between the control instruction C-CODE and a voltage CFV.
Figure 11:
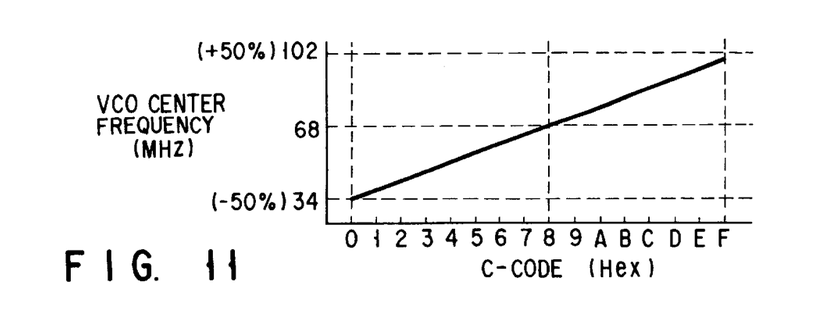
FIG. 11 is a graph showing the relationship between the control instruction C-CODE and the center frequency of the VCO.

FIG. 10 is a graph showing the relationship between the control instruction C-CODE from the system controller and the voltage CFV. FIG. 11 is a graph showing the relationship between the control instruction C-CODE from the system controller and the VCO center frequency VC (VC=VR when C-CODE is "8").

As is apparent from FIGS. 10 and 11, the disk rotation speed is finely and continuously changed by the control instruction C-CODE from the system controller, and at the same time, the control voltage CFV is changed, and the value of the VCO center frequency VC is also changed.

More specifically, the control voltage CFV is set such that the output frequency fout of the VCO of the PLL circuit at a predetermined disk rotation speed (input data rate) always becomes the center frequency VC of the VCO.

With this arrangement, the PLL loop can always be locked according to a change in input data rate within the range of about ±50%.

As has been described above, according to the signal processing circuit of the present invention and the read apparatus using the circuit, the following effects can be obtained.

On the assumption of the variable speed read technique, the read rate is finely and continuously changed by the control instruction C-CODE from the system controller instead of setting a $2^n$-time read rate as discrete values.

In addition, even when the read rate changes, the characteristics of the VCO are set such that the VCO output frequency is always positioned at the center. With this arrangement, a variable range of ±50% with respect to the center frequency can be set to effectively realize the variable speed read technique.

Therefore, the data can be read at the highest allowable read rate for a disk (CD-ROM) to be read. Even in the seek operation, a wide capture range can be set.

When this system is operated, high-speed rotation can be performed at an optimum error rate for each disk, so that a drive apparatus capable of stably performing a high-speed read operation and a high-speed seek operation can be provided.

The present invention can apply to a DVD (Digital Versatile Disc) system. If the optical disc (CD-ROM) system described above is re-designed into a DVD system, 8 to 16 modulation signals will be generated in the DVD system, not EFM (8 to 14 Modulation) signals as in the optical disc system.

In the DVD system, there is no upper limitation to the rotational speed of the disc. (The higher the speed, the greater the data-transfer rate.) There is the trend that the rotational speed of the disc is increased in the DVD system. Hence, the advantages of the present invention can be attained also in the DVD system.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. A signal processing circuit comprising:
    a data slice circuit which binarizes data read from a disk and generates binarized data;
    a PLL circuit receiving the binarized data and having a voltage controlled oscillator which controls an output frequency in accordance with a first control voltage associated with the binarized data, and which is capable of controlling a center frequency in accordance with a second control voltage as an analog signal; and
    wherein the output frequency is changed by the first control voltage and the center frequency is changed by the second control voltage.

2. A signal processing circuit according to claim 1, further comprising a disk motor control circuit which rotates the disk and changing a rotation speed of the disk.

3. A signal processing circuit according to claim 1, further comprising memory means for storing the binarized data, and error correction means, operated on the basis of the output frequency, for performing error correction processing of the binarized data, and generating a correction flag and a corresponding flag.

4. A signal processing circuit according to claim 1, wherein the PLL/circuit includes a phase comparator which compares phases of the binarized data and the output frequency and which outputs the first control voltage, and a detector which detects data associated with a predetermined frequency from the binarized data.

5. A signal processing circuit according to claim 1, wherein the center frequency changes coincidently with the output frequency.

6. A read apparatus comprising:
    a disk motor control circuit which rotates a disk;
    a pickup circuit which reads data from the disk;
    a data slice circuit which binarizes the read data and generates binarized data;
    a PLL circuit receiving the binarized data and having a voltage controlled oscillator which controls an output frequency in accordance with a first control voltage associated with the binarized data, and which is capable of controlling a center frequency in accordance with a second control voltage as an analog signal; and
    wherein when the output frequency is changed by the first control voltage, the center frequency is changed by the second control voltage.

7. A read apparatus according to claim 6, further comprising memory means for storing the binarized data, and error correction means, operated on the basis of the output frequency, for performing error correction processing of the binarized data, and generating a correction flag and a compensation flag.

8. A read apparatus according to claim 6, wherein the PLL/circuit includes a phase comparator which compares phase of the binarized data and the output frequency, and which outputs the first control voltage, and a detector which detects data associated with a predetermined frequency from the binarized data.

9. A read apparatus according to claim 6, wherein the center frequency changes coincidently with the output frequency.

10. A signal processing circuit according to claim 1, wherein when the output frequency is changed, the center frequency is changed to be closer to the output frequency.

11. A signal processing circuit according to claim 1, wherein when the output frequency is changed, the center frequency is changed so that a difference between the center frequency and the output frequency is lessened.

12. A read apparatus according to claim 6, wherein when the output frequency is changed, the center frequency is changed to be closer to the output frequency.

13. A read apparatus according to claim 6, wherein when the output frequency is changed, the center frequency is changed so that a difference between the center frequency and the output frequency is lessened.

14. A signal processing circuit comprising:
    a data slice circuit which binarizes data read from a disk and generates binarized data;
    a controller for generating a control instruction as a digital signal;
    a PLL circuit receiving the binarized data and having a voltage controlled oscillator which controls an output frequency in accordance with a first control voltage associated with the binarized data, and which is capable of controlling a center frequency in accordance with a second control voltage as an analog signal;
    a converter for converting the control instruction into the second control voltage; and
    wherein the output frequency is changed by the first control voltage and the center frequency is changed by the second control voltage.

15. A signal processing circuit according to claim 14, further comprising a converter for converting the control instruction into the second control voltage.

16. A signal processing circuit according to claim 15, wherein the converter is connected between the PLL circuit and an interface circuit, and the controller connected to the interface circuit.

17. A signal processing circuit according to claim 14, further comprising a disk motor control circuit which rotates the disk and changing a rotation speed of the disk.

18. A signal processing circuit according to claim 14, further comprising memory means for storing the binarized data, and error correction means, operated on the basis of the output frequency, for performing error correction processing of the binarized data, and generating a correction flag and a corresponding flag.

19. A signal processing circuit according to claim 14, wherein the PLL circuit includes a first control voltage generator for generating the first control voltage, and the first control voltage generator includes a phase comparator which compares phases of the binarized data and the output frequency, and a frequency detector which detects data associated with a predetermined frequency from the binarized data.

20. A signal processing circuit according to claim 14, wherein the center frequency changes coincidently with the output frequency.

21. A signal processing circuit according to claim 14, wherein when the output frequency is changed, the center frequency is changed to be closer to the output frequency.

22. A signal processing circuit according to claim 14, wherein when the output frequency is changed, the center frequency is changed so that a difference between the center frequency and the output frequency is lessened.

23. A read apparatus comprising:
   a disk motor control circuit which rotates a disk;
   a pickup circuit which reads data from the disk;
   a data slice circuit which binarizes the read data and generates binarized data;
   a controller for generating a control instruction as a digital signal;
   a PLL circuit receiving the binarized data and having a voltage controlled oscillator which controls a output frequency in accordance with a first control voltage associated with the binarized data, and which is capable of controlling a center frequency in accordance with a second control voltage as an analog signal;
   a converter for converting the control instruction into the second control voltage; and
   wherein the output frequency is changed by the first control voltage and the center frequency is changed by the second control voltage.

24. A read apparatus according to claim 23, further comprising a converter for converting the control instruction into the second control voltage.

25. A read apparatus according to claim 24, wherein the converter is connected between the PLL circuit and an interface circuit, and the controller is connected to the interface circuit.

26. A read apparatus according to claim 23, further comprising memory means for storing the binarized data, and error correction means, operated on the basis of the output frequency, for performing error correction processing of the binarized data, and generating a correction flag and a corresponding flag.

27. A read apparatus according to claim 23, wherein the PLL circuit includes a first control voltage generator for generating the first control voltage, and the first control voltage generator includes a phase comparator which compares phases of the binarized data and the output frequency, and a frequency detector which detects data associated with a predetermined frequency from the binarized data.

28. A read apparatus according to claim 23, wherein the center frequency changes coincidently with the output frequency.

29. A read apparatus according to claim 23, wherein when the output frequency is changed, the center frequency is changed to be closer to the output frequency.

30. A read apparatus according to claim 23, wherein when the output frequency is changed, the center frequency is changed so that a difference between the center frequency and the output frequency is lessened.

* * * * *